United States Patent [19]

Onufry, Jr.

[11] 4,215,252
[45] Jul. 29, 1980

[54] VIDEO TELECONFERENCE AUDIO ECHO CONTROL UNIT

[75] Inventor: Michael Onufry, Jr., Brookeville, Md.

[73] Assignee: Communications Satellite Corporation, Washington, D.C.

[21] Appl. No.: 946,298

[22] Filed: Sep. 27, 1978

[51] Int. Cl.² .................... H04B 3/20; H04M 9/08
[52] U.S. Cl. .................... 179/170.2; 179/1 HF
[58] Field of Search ............ 179/1 FS, 1 HF, 1 P, 179/2 TV, 170.2, 170.6, 170.8, 1 CN

[56] References Cited

U.S. PATENT DOCUMENTS

| | | | |
|---|---|---|---|
| 3,206,559 | 9/1965 | Barney | 179/170.2 |
| 3,725,612 | 4/1973 | Campanella et al. | 179/170.6 |
| 3,826,878 | 7/1974 | Bendel | 179/170.2 |
| 3,937,907 | 2/1976 | Campanella et al. | 179/170.6 |
| 3,985,979 | 10/1976 | Durand et al. | 179/170.8 |
| 4,008,376 | 2/1977 | Flanagan et al. | 179/1 CN |
| 4,049,911 | 9/1977 | Schlaff et al. | 179/1 HF |
| 4,052,562 | 10/1977 | Andersen | 179/1 HF |
| 4,115,668 | 9/1978 | Skrovanek et al. | 179/170.2 |

Primary Examiner—Robert S. Tupper
Assistant Examiner—Randall P. Myers
Attorney, Agent, or Firm—Sughrue, Rothwell, Mion, Zinn & Macpeak

[57] ABSTRACT

An audio echo control unit for a video teleconference system is provided with a suppression attack time which is a function of the microphone-to-audio speaker distance and a suppression hangover time which is a function of the room characteristics. Echo which results from a double-talk condition is eliminated by removing the break-in capability, and receive signal level modulation is eliminated by removing any variable loss devices from the transmission path.

8 Claims, 3 Drawing Figures

VIDEO TELECONFERENCE AUDIO ECHO CONTROL UNIT

BACKGROUND OF THE INVENTION

In many communication systems, e.g., telephone systems, it is common to connect two-wire local lines to the four-wire trunk lines via a hybrid or other isolation network. The four-wire system provides separate one-way paths for transmission and reception of signal energy while the two-wire local circuit provides a single two-way path between the subscriber and the terminal at which the two- and four-wire systems are connected. When the signal energy on one path of the four-wire circuit is coupled into the two-wire local circuit through the hybrid, part of the signal is returned over the other path of the four-wire line back to the terminal where the signal originated due to impedance mismatches at the hybrid. This returning signal is known as echo.

When the transmission path length is relatively short, the time delay between the transmission of speech from a subscriber set to the return of the echo at that set is very short, and the echo will present little or no problem. However, in longer transmission systems, such as long line systems or systems employing geosynchronous satellites as repeater stations, the time delay can be in excess of a half second. An echo which occurs a half second after all transmitted speech would be extremely annoying to the subscriber and, therefore, it is necessary to provide some type of echo attenuation.

Echo suppressors have been used as a partial solution to this problem. See, for example, U.S. Pat. Nos. 3,896,273 and 3,206,559. Conventionally, a half echo suppressor is located near each hybrid terminal on the four-wire side of the system. When a far-end talker begins to speak, his signal is detected by a voice detector in the echo suppressor of the near-end talker. The voice detector then causes a switch to open the echo return transmission path to prevent the echo from returning to the far-end talker. A break-in feature is typically provided so that if the near-end talker begins to speak while the far-end talker is still speaking, the transmission path will be enabled. This is accomplished by providing a break-in switch in parallel with the echo suppression switch to bypass the open echo suppression switch when the level of signal activity at the near-end transmission path is greater than that on the near-end received path.

For purposes of explanation, a simplified functional block diagram of an echo suppressor used in long distance telephone communications is shown in FIG. 1. For a detailed explanation of its operation, reference is made to CCITT Recommendation G.161 (Orange Book), Sixth Plenary Assembly, 1976, Volume 5. In brief, its operation is as follows.

Received speech present on four-wire transmission path 1 is recognized by a speech detector 2, which causes normally closed switch 5 to open. Due to impedance mismatches in the hybrid 8, a portion of the speech signal on receive line 1 will pass through the hybrid 8 to the transmit line 12. The opening of switch 5 will prevent this echo signal from returning to the far-end speaker. When the receive speech on line 1 terminates, switch control 4 continues to keep switch 5 open for a hangover time interval set by delay 9.

The break-in mode is activated when the near-end talker 10 wishes to interrupt the far-end talker who is generating the received speech on line 1. In this case, the speech detector 11 compares the levels of the transmit and receive speech, and when the signal level on the transmit line 12 is equal to or greater than the receive speech on line 1, speech detector 11 will activate a switch control 13. The switch control causes a normally open switch 6 to close, thus bypassing the open switch 5 and permitting the near-talker speech to be transmitted to the far end. Simultaneously, a normally closed switch 7 will open, thus causing a loss 14 to be inserted into the receive speech path. In some echo suppressors, switch 7 is opened when transmit speech is present on line 12, regardless of whether or not receive speech is present on line. When the double-talk condition stops, switches 6 and 7 are maintained in their open and closed positions for hangover times determined by delays 15 and 16, respectively. During double-talk, the level of speech heard by the near talker 10 is reduced by the loss 14, but some echo from the received speech line 1 is still transmitted along with the near-talker speech on the transmit line 12.

Although echo suppression systems of the above-described type have been found suitable for most telephone system applications, there are certain serious disadvantages which arise from the use of such conventional systems in a speaker phone system. First, there is a tendency for the suppressor to break in on its own echo, i.e., the echo level on the transmit line 12 may be sufficient to trigger the break-in mode. This will falsely activate the double-talk circuitry and permit a burst of echo to occur. Such an echo burst tends to be more noticeable than in a conventional telephone call since there may be a number of "third-party listeners" participating in the teleconference who are not involved in the conversation and are, therefore, more critical of what they hear. A second problem is that a conventional echo suppressor tends to respond quickly to noise bursts due to open microphone pickup of noises such as finger tapping, microphone handling, clothes movement, etc. If this noise is considered by the suppressor to be speech, the double-talk mode of operation will be triggered. This will permit an echo to return to the far-end talker and the opening of switch 7 will simultaneously reduce the speech level for the listeners. An additional problem is that, in those echo suppressors in which the switch 7 is opened during speech transmission, regardless of whether or not a speech signal is being received, anytime a person in the room is speaking, the background noise emanating from the speaker phone is reduced. This modulation of background noise is annoying to listeners in the same room as the speaker.

In teleconferencing via a four-wire connection, the echo is caused by the acoustical feedback from the loud-speaker to the microphone rather than by a hybrid. The sound propagation velocity in air is approximately 1 ft/ms. The direct sound end delay time in milliseconds corresponds to the loud-speaker(s)-to-microphone(s) distance in feet and normally exceeds the telephone echo suppressor's typical 3 ms suppression operate time. The reverberated sound delay depends on the sound absorption of the reflecting surfaces in the room and the room volume, and may exceed the typical 50 ms suppression hangover time of the telephony echo suppressor.

A different type of echo suppression which is commonly used in speaker phone systems is the use of a variable loss device in either one of the transmitting and receiving channels during talking. Such a system is described in U.S. Pat. No. 3,952,166. That system includes a variable loss element which is varied in dependence on the loud-speaker-to-microphone distance in order to compensate properly for the acoustic coupling between the speaker and microphone. An undesirable feature of such a system is that the variable loss device will cause an annoying sound level modulation to the listener. Further, such a system has a tendency to sound hollow, depending on the volume of the talker and the size of the room in which the loud-speaker is located. In such systems, longer propagation delays require longer losses, and in some cases, the amount of loss required may increase to a point where it interferes with the transfer of information between parties.

Echo, hollow sounding speech and speech level modulation significantly detract from the quality of the teleconference. Thus, there is a need for an improved echo suppression system which will substantially alleviate these problems. The present invention is specifically directed to a system which will alleviate the above-described problems in a video teleconference system, which is essentially a speaker phone system accompanied by a visual image.

SUMMARY OF THE INVENTION

Accordingly, it is an object of this invention to provide an echo suppression system in which the false operation of the suppressor due to extraneous noise is minimized.

It is a further object of this invention to decrease the frequency of occurrence of echo bursts and to decrease the level of noise modulation.

It is a still further object of this invention to provide an echo suppression system in which the speech level modulation is eliminated.

It is a still further object of this invention to substantially eliminate echo resulting from acoustic reverberation within the teleconference room.

These and other objects are achieved in a video teleconference system by increasing the suppression attack time, i.e., the time delay between the detection of receive speech and the activation of the echo suppression switch, in order to decrease the probability of false operation of the suppressor due to noise. This suppression attack time should be adjustable and dependent upon the distance between the microphone and the speaker in the teleconference room. The echo burst as well as the noise and level modulation are eliminated by disabling the break-in mode of operation in the echo suppressor. Finally, echo due to acoustic reverberation within the teleconference room is eliminated because the suppression hangover time, i.e., the time delay supplied by delay 9 in FIG. 1, is adjustable and is tuned to the size of the room.

The above-mentioned U.S. Pat. No. 3,206,559 is of interest to the present invention in that it teaches the variation of the suppression attack and hangover time as a function of the transmission path length. However, that system provides an echo suppressor at only one end of the system, and the "attack" and "hangover" times in that system are the time after near-end speech that a variable impedance is inserted into the near-end receive line and the time that it remains in the line after the cessation of near-end speech in order to suppress echoes which may return from the far end. In contrast, the "attack" and "hangover" times as used herein refer to the time after detected receive speech that a suppression switch in the transmit line is activated and the time after cessation of receive speech that the suppression switch remains open. Thus, U.S. Pat. No. 3,206,559 is concerned with problems associated with transmission path length whereas the present invention is concerned with problems associated with the near-end subscriber station.

BRIEF DESCRIPTION OF THE DRAWINGS

The present invention will be more clearly understood by reference to the following description in conjunction with the accompanying drawings in which similar components are designated by the same reference numerals, and in which.

DETAILED DESCRIPTION OF THE PREFERRED EMBODIMENT

Figure 1:
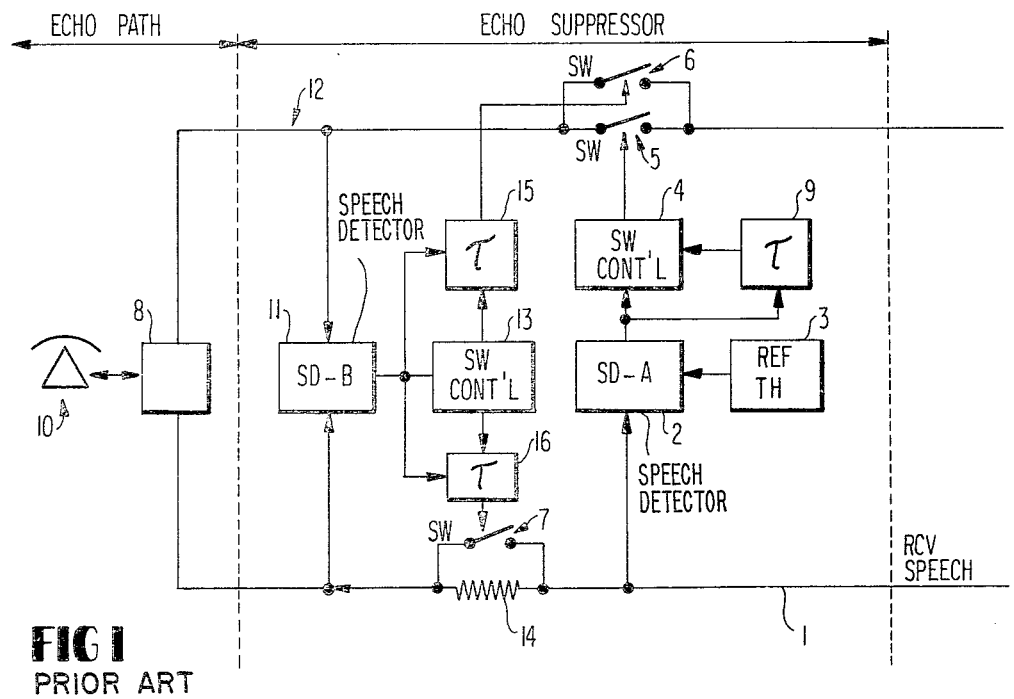
FIG. 1 is a simplified functional block diagram of a conventional half echo suppressor.
Figure 2:
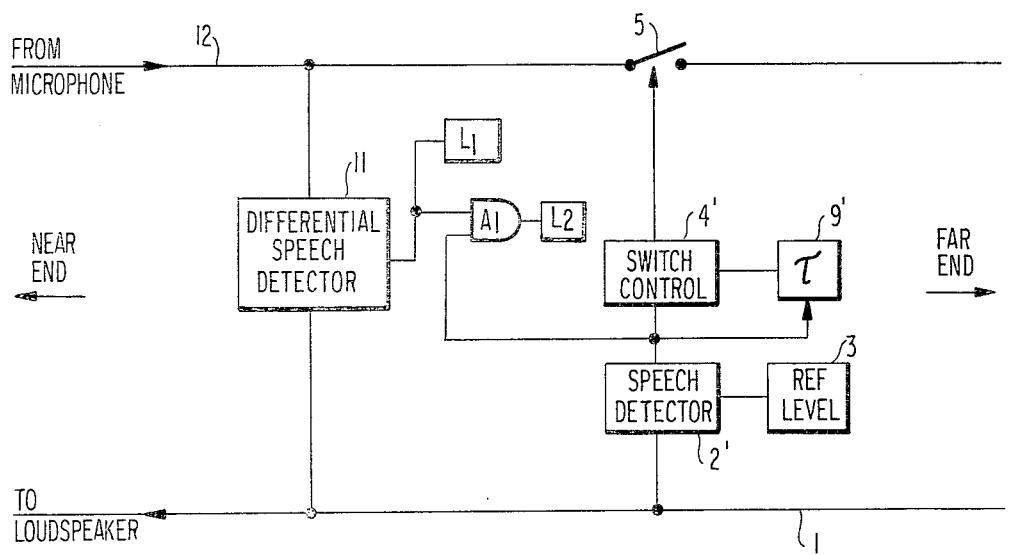
FIG. 2 is a simplified functional block diagram of an echo suppressor according to this invention.

FIG. 2 illustrates an audio echo control unit which is suitable for use in a video teleconference system. The four-wire circuit is connected to the speaker and microphone in the teleconference room with the transmit line 12 connected to the microphone and the receive line 1 connected to the loud-speaker. The break-in circuitry of FIG. 1 has been eliminated and the suppression switch 5 remains. The remaining components 2', 3', 4' and 9' correspond to elements 2, 3, 4 and 9, respectively, in FIG. 1.

The elimination of the break-in mode of operation in the echo suppressor is made possible by the video link. Visual contact with the other speaker will inform the listeners when the speaker is finished and, therefore, the inability to break in will not significantly detract from the conducting of the conversation. Listeners will quickly learn that they cannot interrupt, and this will actually benefit the functioning of the teleconference. Without the break-in circuitry, the bursts of echo and the noise modulation characteristic of conventional echo suppression systems will be eliminated. Further, since the variable loss element is not needed for the break-in circuitry, receive level modulation caused by double-talk will be eliminated.

The false operation of the echo suppressor due to noise is minimized by increasing the suppression attack time, i.e., the time required for the speech detector to activate the switch control once it has determined that the reference level supplied by the threshold device 3 has been exceeded. This attack time is adjustable and is dependent upon the distance between the microphone and the speaker in the teleconference room, as will be discussed in more detail below.

The echo generated by acoustic reverberation within the teleconference room as a result of receive speech broadcast from a speaker reflecting off hard surfaces within the room is not transmitted back into the microphone because the suppression hangover time, i.e., the time period during which switch 5 is maintained open after the last activation signal from the speech detector, is adjustable and is set sufficiently long to permit the echo energy to be absorbed within the room.

Figure 3:
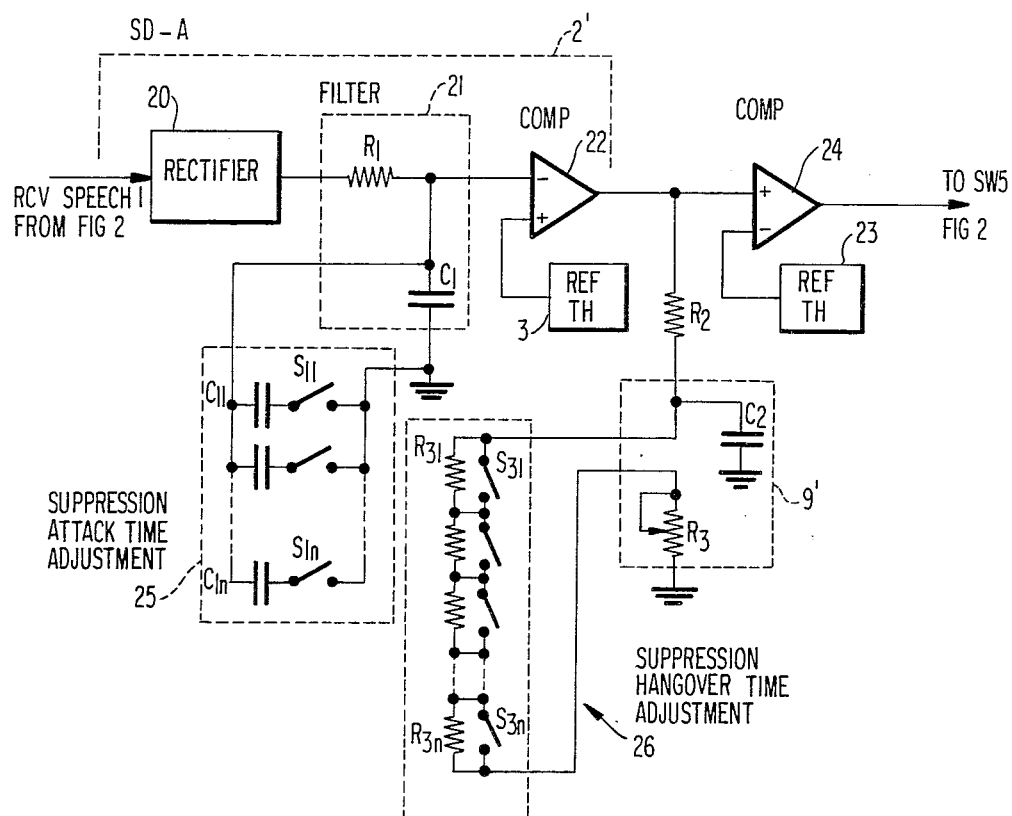
FIG. 3 is a schematic diagram of a circuit which would be suitable for controlling the suppression attack and hangover times in the echo suppressor of FIG. 2.

One example of circuitry which is suitable for the speech detector 2', reference threshold device 3', switch control 4' and delay 9' is shown in FIG. 3. The speech detector 2' consists of a rectifier 20, filter 21 and comparator 22. Receive speech from line 1 is rectified in the rectifier 20 and filtered in the filter 21. The R1 C1 combination determines how fast a voltage builds up on capacitor C1. When this voltage on capacitor C1 exceeds the voltage of the reference threshold 3, comparator 22 changes state so that the non-inverting input to the comparator 24 becomes less than the inverting input supplied by the reference threshold device 23. Accordingly, comparator 24 changes state and switches the normally closed switch 5 of FIG. 2 into an open position. The time which elapses from the start of a signal on line 1 to the opening of switch 5 is the suppression attack time and is determined primarily by the R1 C1 time constant. In order to provide for adjustment of the suppression attack time, a suppression attack time adjustment circuit 25 is included which consists essentially of a plurality of capacitors C11-C1n, each connected in series with a respective switch S11-S1n, and all of the series circuits connected in parallel across the capacitor C1. The selection of an appropriate switch will increase the capacitance in the R1 C1 time constant, thereby slowing down the voltage rise at the inverting input to comparator 22 to delay the activation of the suppression switch 5 in FIG. 2.

The present CCITT recommendation for echo suppressor suppression attack time is $\leq 5$ msec. In a video teleconference system, applicants have determined that the suppression attack time should be given by:

$$\text{Supp}_{Atk} \leq 0.005 + d/c \text{ sec} \quad (1)$$

where d = the minimum microphone-to-audio speaker distance in feet; and c = the velocity of sound propagation in air in feet/second.

The switches S11-S1n are preferably accessable from the front of the unit and can be set when the echo control unit is installed so that it can be optimally tuned for each teleconference room with a minimum of effort.

The suppression hangover circuitry will now be explained. Referring again to FIG. 3, when the comparator 22 changes state, the capacitor C2 is quickly charged through the resistor R2 so that the reference threshold at the inverting input to comparator 24 supplied by the reference threshold device 23 is exceeded, thus causing comparator 24 to change state. Switch 5 will remain open for as long as the voltage on capacitor C2 exceeds the level supplied by the reference level device 23. When the speech on line 1 terminates, comparator 22 reverts to its original state and capacitor C2 begins to discharge through resistance R3. When capacitor C2 discharges to less than the reference voltage level supplied by the reference unit 23, comparator 24 changes state and causes switch 5 to return to its normally closed position. The time which elapses from the cessation of speech on line 1 to the closing of switch 5 is the suppression hangover time. It is controlled primarily by the C2 R3 time constant and the voltage level supplied by reference unit 23.

In order to achieve adjustment capability of the suppression hangover time to compensate for reverberations within the teleconference room, a suppression hangover time adjustment circuit 26 is provided which consists essentially of a plurality of resistors R31-R3n connected in series and each of which is connected in parallel with a respective switch S31-S3n. The selection of an appropriate switch increases the resistance in the R3 C2 time constant, thereby slowing down the discharge of capacitor C2 and delaying the return of switch 5 in FIG. 2 to its normally closed position. The present CCITT recommendation for echo suppressor suppression hangover time is 40-75 msec. In a video teleconference environment, applicants have determined that the suppression hangover time should be calculated from:

$$E = E_0 \exp[-cAt/4V] \quad (2)$$

where $E_o$ = initial sound energy density;

E = sound energy density present t seconds after termination of $E_o$;

c = velocity of sound in air;

V = volume of the room in cubic feet; and

A = total absorption in Sabin (Sabin = a unit of acoustic absorption equivalent to the absorption by one square foot of a perfect absorber). Solving for t yields:

$$t = \frac{4V}{cA} \log \frac{E_o}{E} \quad (3)$$

As a practical matter, a value of about 50 db may be used for the term (log $E_o/E$) so that (3) becomes:

$$t = 200V/cA$$

Rather than completely eliminate the differential speech detector 11 from the device of FIG. 1, it would also be possible to merely disconnect the output of the speech detector 11 from the switch control circuitry 13 and to connect it instead to an indicating lamp L1 which will indicate to the subscriber that his speech level is exceeding that of the received speech level. It would also be possible to combine the outputs of the differential speech detector 11 and the speech detector 2' through an AND gate A1 to energize a second illuminator L2 which would indicate to the subscriber that his speech was not being transmitted because the echo control unit is in the suppression mode. These optional features are shown in FIG. 2.

The use of equation (1) to determine the suppression attack time is a significant improvement over the prior art in which an attack time of less than 5 msec has typically been used. Further, the use of equations (3) or (4) to determine the suppression hangover time is a significant improvement over the prior art systems in which the suppression hangover time has typically been determined by subjective testing based on speech properties and totally ignoring the acoustic room parameters. Finally, disabling of the break-in mode, although undesirable in normal telepone or speaker phone systems, is a significant improvement in video teleconferencing since the video link provides an alternate communication path. The ability to eliminate the break-in mode means that the disturbing talker echo is eliminated and the receive level modulation due to loss normally inserted in the receive path during double-talk is also eliminated. Thus, the present invention provides an echo suppression system for video teleconferencing in which false suppressor operation due to ambient noise is minimized, echo bursts, noise modulation and receive level modulation are eliminated, and acoustically generated echo within the teleconference room is also eliminated.

What is claimed is:

1. In a video teleconference system of the type including a four-wire transmission circuit having a receive line and a transmit line connected to a loud-speaker and microphone, respectively, an echo suppression apparatus comprising:
   (a) first threshold means for generating a first threshold level signal;
   (b) means for detecting the level of speech signal activity on said receive line and comparing it to said threshold level signal and, when said detected level exceeds said threshold level, for providing an output signal after a first delay period $\text{Supp}_{Atk}$ determined by the distance between the loudspeaker and microphone, said delay period given by:

$$0.005 \text{ sec} < \text{Supp}_{Atk} \leq 0.005 + d/c \text{ sec}$$

where
   d = the minimum microphone to audio speaker distance in feet; and
   c = the velocity of sound propagation in air in feet/second;
   (c) a normally closed suppression switch in said transmit line openable by a control signal; and
   (d) means responsive to said detection means output for supplying said control signal to said suppression switch and for maintaining said control signal for a second delay period t after termination of said detection means output signal.

2. In a video teleconference system of the type including a four-wire transmission circuit having a receive line and a transmit line connected to a loud-speaker and microphone, respectively, an echo suppression apparatus comprising:
   (a) first threshold means for generating a first threshold level signal;
   (b) means for detecting the level of speech signal activity on said receive line and comparing it to said threshold level signal and, when said detected level exceeds said threshold level, for providing an output signal after a first delay period $\text{Supp}_{Atk}$;
   (c) a normally closed suppression switch in said transmit line openable by a control signal; and
   (d) means responsive to said detection means output for supplying said control signal to said suppression switch and for maintaining said control signal for a second delay period t after termination of said detection means output signal, said second delay period t being greater than 75 milliseconds and defined by:

$$t = \frac{4V}{cA} \log \frac{E_o}{E} \tag{3}$$

where
   $E_o$ = initial energy density of sound emanating from the speaker;
   E = sound energy density present t seconds after termination of $E_o$;
   c = velocity of sound in air;
   V = volume of the room in cubic feet; and
   A = total absorption in Sabin (Sabin = a unit of acoustic absorption equivalent to the absorption by one square foot of a perfect absorber).

3. An echo suppression apparatus as defined in claim 2 wherein said first delay period $\text{Supp}_{Atk}$ is dependent on the loudspeaker-to-microphone distance and is given by $$0.005 \text{ sec} < \text{Supp}_{Atk} \leq 0.005 + d/c \text{ sec}$$

where
   d = the minimum microphone to audio speaker distance in feet.

4. An echo suppression apparatus as defined in any one of claims 1–3 wherein said detection means comprises a rectifier for receiving the signal from the receive line and supplying a rectified output signal, a filter for receiving the rectified output signal and a comparator for providing said detection means output signal when the output of said filter exceeds said first threshold level, said detection means further comprising a first adjustment means for adjusting the time constant of said filter in order to vary the duration of said first delay period.

5. An echo suppression apparatus as defined in any one of claims 1–3 wherein said control means comprises a second threshold means for providing a second threshold level signal and a comparator for receiving at a first input terminal the output of said detection means and at a second input terminal said second threshold level signal and for providing said switch control signal when the potential at its first input terminal exceeds that at its second input terminal, said echo suppression apparatus further comprising a capacitor connected through a first resistance to said first input terminal of said switch control comparator for quickly charging in response to said detection means output, and a variable second resistance through which the charge on said capacitance decays after termination of the output from said detection means, the decay time of said capacitance through said second resistance determining said second delay period.

6. An echo suppression apparatus as defined in any one of claims 1–3 in which no break-in switch is provided for bypassing said suppression switch in response to signal activity on said transmit line.

7. An echo suppression apparatus as defined in claim 6 in which no means is provided for inserting a loss into said receive line in response to signal activity on said transmit line.

8. An echo suppression apparatus as defined in claim 7 further comprising a differential detection means for comparing the level of signal activity on said receive and transmit lines and, when said suppression switch is open and speech is detected on said transmit line, providing an indication that the speech on said transmit line is being blocked.

* * * * *

UNITED STATES PATENT AND TRADEMARK OFFICE
CERTIFICATE OF CORRECTION

PATENT NO. : 4,215,252

DATED : July 29, 1980

INVENTOR(S) : Michael Onufry, Jr.

It is certified that error appears in the above-identified patent and that said Letters Patent are hereby corrected as shown below:

IN THE SPECIFICATION:

Column 6, line 58 - delete "telepone" insert --telephone--

Signed and Sealed this

Eighteenth Day of November 1980

[SEAL]

Attest:

SIDNEY A. DIAMOND

Attesting Officer

Commissioner of Patents and Trademarks